US010093507B2

(12) United States Patent
Fauconneau et al.

(10) Patent No.: US 10,093,507 B2
(45) Date of Patent: Oct. 9, 2018

(54) DEVICE FOR HOLDING A FLAT SHEET-SHAPED ELEMENT CIRCULATING IN A PROCESSING MACHINE

(71) Applicant: BOBST MEX SA, Mex (CH)

(72) Inventors: Olivier Fauconneau, Strasbourg (FR); Bernard Jaquet, Rue (CH)

(73) Assignee: BOBST MEX SA (CH)

(*) Notice: Subject to any disclaimer, the term of this patent is extended or adjusted under 35 U.S.C. 154(b) by 0 days.

(21) Appl. No.: 14/439,504

(22) PCT Filed: Oct. 7, 2013

(86) PCT No.: PCT/EP2013/003009
§ 371 (c)(1),
(2) Date: Apr. 29, 2015

(87) PCT Pub. No.: WO2014/067611
PCT Pub. Date: May 8, 2014

(65) Prior Publication Data
US 2015/0259170 A1 Sep. 17, 2015

(30) Foreign Application Priority Data
Oct. 30, 2012 (EP) .................................... 12007431

(51) Int. Cl.
B65H 29/24 (2006.01)
B41F 19/06 (2006.01)
(Continued)

(52) U.S. Cl.
CPC ....... *B65H 29/241* (2013.01); *B32B 37/0053* (2013.01); *B41F 19/064* (2013.01);
(Continued)

(58) Field of Classification Search
CPC ...... B65H 5/04; B65H 29/241; B65H 29/686; B65H 29/044; B41J 11/0085; B32B 37/0053
(Continued)

(56) References Cited

U.S. PATENT DOCUMENTS 3,617,048 A * 11/1971 Albert .................. B65H 3/0883
271/108
4,302,001 A * 11/1981 Liepert ................ B65H 29/241
271/183

(Continued)

FOREIGN PATENT DOCUMENTS

EP          1 721 750 A1   11/2006
WO    WO 2010/102783 A1    9/2010

OTHER PUBLICATIONS

International Search Report dated Jan. 10, 2014 issued in corresponding International patent application No. PCT/EP2013/003009.

*Primary Examiner* — John L Goff, II
(74) *Attorney, Agent, or Firm* — Ostrolenk Faber LLP

(57) ABSTRACT

A holding device (1) for a succession of sheet-shaped elements circulating in a processing machine (100) along conveying path T. The holding device (1) has two series (10, 20) of a plurality of suction members (11, 21). At least one series of suction members 20 extends along and is movably mounted parallel to the transport path T of the sheets, between a retracted position and a deployed position. Each series is in an array, parallel to the transport path and the suction members are arranged spaced apart alongside one another, so that the array of members extend perpendicular to the conveying path T of the sheets and the suction members (11, 21) of each series (10, 20) are transversely offset relative to the suction members (11, 21) of the other series (10, 20).

20 Claims, 3 Drawing Sheets

(51) Int. Cl.
*B65H 29/04* (2006.01)
*B65H 29/52* (2006.01)
*B65H 29/68* (2006.01)
*B32B 37/00* (2006.01)

(52) U.S. Cl.
CPC .......... *B65H 29/044* (2013.01); *B65H 29/52* (2013.01); *B65H 29/686* (2013.01); *B65H 2301/4493* (2013.01); *B65H 2406/351* (2013.01); *B65H 2511/11* (2013.01); *B65H 2701/176* (2013.01); *B65H 2801/21* (2013.01)

(58) Field of Classification Search
USPC .................................................. 271/84, 266
See application file for complete search history.

(56) References Cited

U.S. PATENT DOCUMENTS

| | | | |
|---|---|---|---|
| 6,152,444 | A | 11/2000 | Elgee et al. |
| 6,305,285 | B1 * | 10/2001 | Steven ...................... B41F 1/32 101/474 |
| 2003/0173734 | A1 | 9/2003 | Wong et al. |
| 2005/0248084 | A1 | 11/2005 | Pollien |
| 2011/0233845 | A1 * | 9/2011 | Mandel ...................... B41J 3/28 271/3.14 |
| 2012/0247352 | A1 * | 10/2012 | Fornay ................... B41F 19/06 101/27 |

* cited by examiner

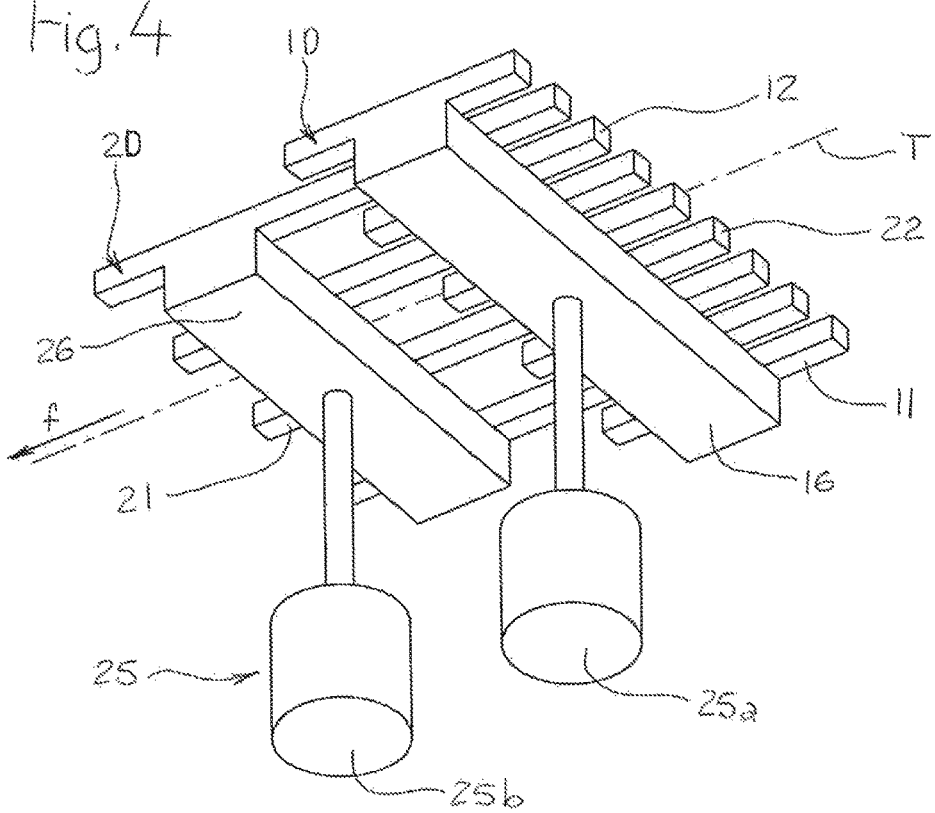
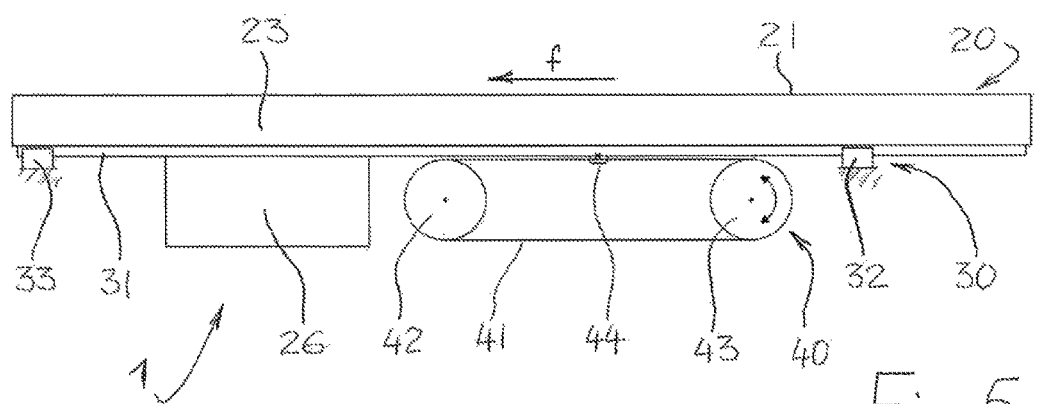

DEVICE FOR HOLDING A FLAT SHEET-SHAPED ELEMENT CIRCULATING IN A PROCESSING MACHINE

CROSS-REFERENCE TO RELATED APPLICATIONS

The present application is a 35 U.S.C. §§ 371 National Phase conversion of PCT/EP2013/003009, filed Oct. 7, 2013, which claims priority of European Patent Application No. 12007431.5, filed Oct. 30, 2012, the contents of which are incorporated by reference herein. The PCT International Application was published in the French language.

FIELD OF THE INVENTION

The present invention relates to a device that holds a succession of elements in sheet form flat when these elements are passing through a processing machine.

The invention finds a particularly advantageous, although not exclusive, application in the field of the manufacture of packaging made of paper or light card.

BACKGROUND OF THE INVENTION

In the packaging manufacturing industry, packaging is made from a sheet of card generally in several steps. This is why known processing machines of the prior art are traditionally made up of several successive workstations through which each sheet is moved sequentially. In practice, each sheet is conveyed individually from one workstation to another by pulling it via its front edge, after leaving the rest of the sheet not held in any particular way.

In order for the sheet nonetheless to maintain a certain degree of flatness as it decelerates on arriving at a workstation, it is known practice to brake its rear portion during the sheet introduction phase by using a suction bed. Installed transversely in close proximity to the entry to the workstation, such a braking device performs its function by restraining the rear portion of the sheet using suction, while at the same time allowing it progressively to slide as its front portion is driven forward.

There are also processing machines in which the sheets are moved over relatively long distances, for example to pass through a station in which no particular operation is performed. A notable example here might be printing machines using hot foil stamping, commonly known as foil stamping machines, wherein the sheets are transferred from the platen press to the delivery station, via the foil feed and recovery station. Whatever the case, in such a situation, it is important not only to brake each sheet as it decelerates, but also to hold it flat throughout the whole duration of the transfer.

In order to address this difficulty, one idea has been placing a vacuum chamber under the sheet transfer pathway to act as a holding device, i.e. both to support and to brake the sheet. Such a vacuum chamber can be likened to some extent to a large-size suction bed, in which the suction orifices are concentrated chiefly in the downstream part, whereas the rest of the chamber acts essentially as a support. This chamber is usually mounted with an ability to move in longitudinal translation so that it can be moved to suit the format of the sheets being conveyed, in the knowledge that its optimum position of use is as close as possible to the location at which the sheet will ultimately become immobilized at the end of transfer. It should be noted that, in the case of the foil stamping machine cited as an example, this location corresponds precisely to the location at which the stack forms in the delivery station.

This type of holding device does, however, have the disadvantage of being active only in line with the chamber, such that when the latter is to be moved into the most downstream portion of the sheet transfer pathway, it will then no longer be able to perform the holding function in the most upstream portion. In addition, the monolithic structure of the suction chamber naturally has a tendency to limit the effectiveness of such a holding device in the upstream part of the transfer pathway. This is because as a sheet approaches the upper surface of the chamber, an air cushion is created between the two of them and that significantly disrupts the fall and then the firm holding-down of said sheet.

SUMMARY OF THE INVENTION

Hence, the technical problem addressed by the subject matter of the present invention is that of proposing a device for holding a succession of flat elements in sheet form passing through a processing machine along a given conveying path, which device would make it possible to avoid the problems of the prior art by offering significantly improved effectiveness.

According to the present invention, the holding device comprises two series of suction members each of which is made up of several suction members placed side by side in a spaced-apart fashion, in an array perpendicular to the sheet conveying path (T), so that the suction members of each series are transversely offset with respect to the suction members of the other series, and so that at least one series of suction members is mounted with the ability to move parallel to the sheet conveying path between a retracted position, in which the suction members of each series are interposed between the suction members of the other series, and a deployed position, in which the suction members of each series are longitudinally offset with respect to the suction members of the other series.

Throughout this text, the idea of a flat element denotes in very broad terms any body that is flattened and of small thickness, irrespective of its contour, format or of the material of which it is made. Examples include an entire sheet, a precut sheet, a set of shots or cutouts with localized interconnects, an individual shot or cutout obtained after a shot separation operation, etc. Following that logic, such a flat element may be made of any material, and notably of paper, compact cardboard, corrugated cardboard, plastic, etc.

All the terms defining a position in space, such as "transversely", "longitudinally", "upstream" or "downstream", are to be understood with respect to the conveying path and the direction of travel of the sheets within the processing machine.

The invention has an advantage of having a variable-geometry structure which allows it to perform the holding function over the entire extent of the conveying path considered, in terms of braking or in terms of support. Thanks to the relative mobility between the two series of suction members, it is possible to alter the length of the holding device and thus adapt it to suit the total actual distance that the sheets have to cover. That distance is dependent on the format of these sheets. Once deployed along the entire length of the conveying path, the holding device according to the invention is therefore capable of permanently braking each sheet as it is being conveyed, and also of supporting each sheet at any moment if the conveying in question is interrupted.

The holding device according to the invention also has a perforated structure which itself allows air to be removed easily as a sheet approaches and/or moves. It is thus possible to get around the air cushion effect problems of the prior art, and this ultimately makes it easier for the sheet to drop onto and then be held down firmly against the suction members.

The invention can be employed in any type of processing machine capable of working on flat elements in sheet form, such as a cutting machine or a foil stamping machine, for example. However, the more likely the machine in which it is mounted is to process a wide variety of sheet formats, the more relevant such a use becomes.

Of course, a holding device according to the invention is not a priori supposed to operate over the entire journey of the sheets within the processing machine. Rather, it will be advantageously installed in any portion of this journey in which no specific operation is being performed on the sheets. Of course, the length of this journey portion should be long enough to justify such an installation.

The present invention also relates to the features that will become apparent from the following description and which will need to be considered in isolation or in any technically possible combination. This description, given by way of nonlimiting example, is intended to provide a better understanding of what the invention consists of and how it may be embodied. The description is given with reference to the attached drawings in which:

BRIEF DESCRIPTION OF THE DRAWINGS

FIG. 4 shows the holding device in perspective from beneath the device and in its retracted position.

FIG. 5 shows a drive mechanism the purpose of which is to move the mobile part of the holding device.

DESCRIPTION OF AN EMBODIMENT

The same elements have been denoted by identical references. Only those elements that are essential to understanding the invention have been depicted, and have been so schematically and not to scale.

Figure 1:
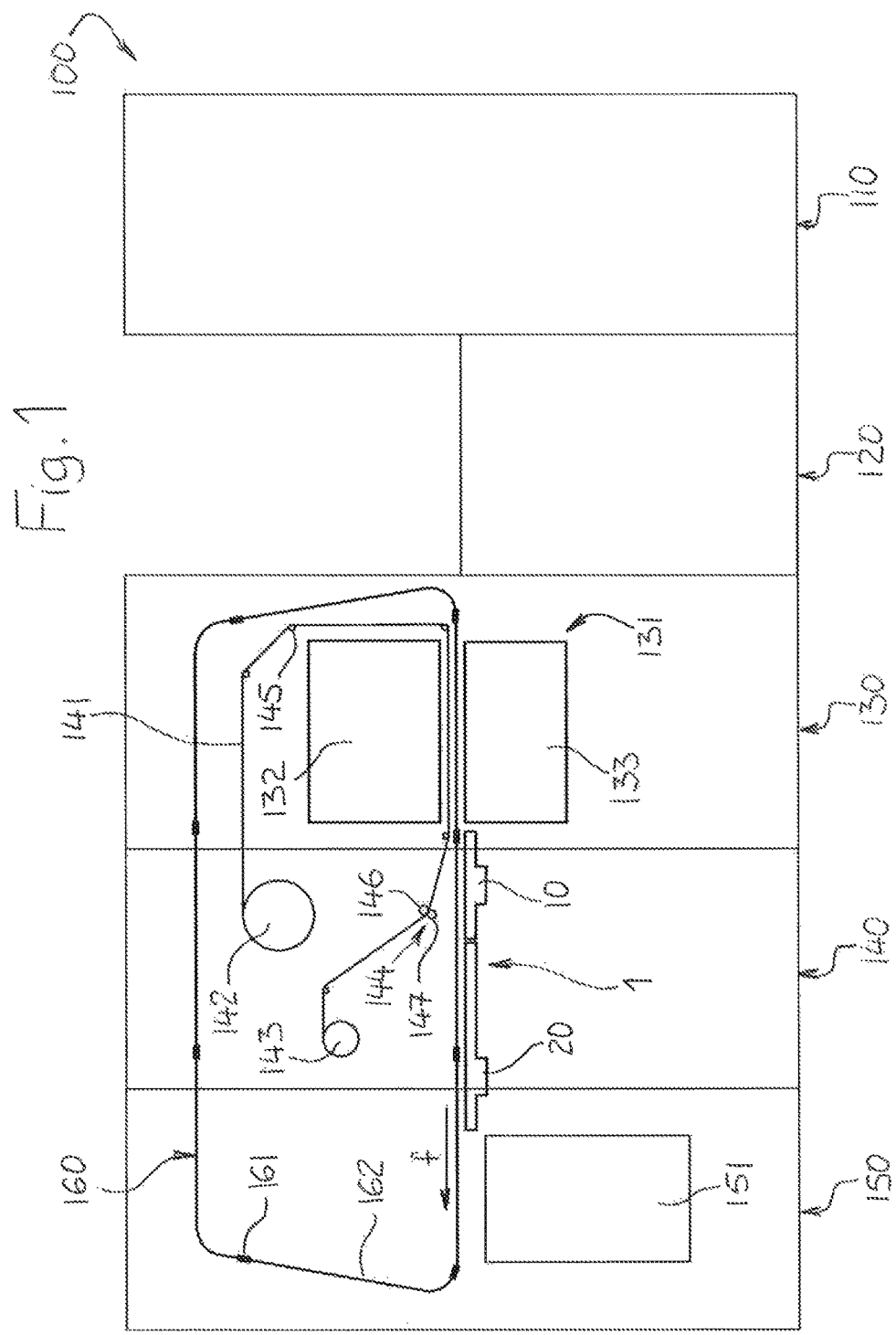
FIG. 1 illustrates a foil stamping machine into which a holding device according to the invention is incorporated.

FIG. 1 therefore illustrates a printing machine 100 that uses stamping to customize cardboard packagings intended for the luxury goods industry. Such a processing machine, commonly referred to as a foil stamping machine, known in the prior art. It will therefore not be described in detail here, either in terms of its structure or in terms of its operation.

This foil stamping machine 100 is made up in the conventional way of several workstations 110, 120, 130, 140, 150 which are juxtaposed to form a unit assembly capable of processing a succession of flat elements in sheet form. Thus, the entry to the machine comprises a sheet feeder 110, performing the function of feeding the machine, sheet by sheet, from a stack, followed by a feed table 120, on which the sheets are laid out in a stream before repositioning one sheet after the other with precision.

Next is a stamping station 130 which uses a platen press 131 to apply to each sheet, a hot foil stamping, metalized coating which comes from a stamping foil 141. The actual stamping operation itself takes place between an upper platen 132, which is static, and a lower platen 133, which is mounted with the ability to move vertically up and down.

The next module in the machine 100 comprises a foil feed and recovery station 140. The purpose of this station is to deliver the foil 141 which is stored wound around a feed reel 142, then to recover it by winding it around a recovery reel 143 once it has been used after passing through the platen press 131. Between the point at which it is stored and the point at which it is recovered, the foil 141 is driven along by a drive system 144. This system is mainly made up of a series of turn bars 145, which are installed along the path followed in order to guide the movement of the foil 141, and of a combination of a feed shaft 146 and of a press roller 147 which are positioned downstream of said path so that they can pull the foil 141 along.

The foil stamping machine 100 ends with a delivery station 150 in which the sheets, which arrive one after another, are reformatted into a stack 151. To do that, the conveying means 160 which have the task of pulling the sheets individually from the exit from the feed table 120 as far as the delivery station 150 (arrow f) are moreover arranged so that they automatically release each sheet once the latter has come into line with the stack 151 which is in the process of being formed in the delivery station 150. Conventionally, these conveying means 160 use a series of gripper bars 161 which are mounted with the ability to effect a transverse translational movement, via two sets of chains 162 arranged laterally one on each side of the foil stamping machine 100.

FIG. 1 also shows that the foil stamping machine 100 at 140 is equipped with a holding device 1. Its function is to hold each sheet flat throughout the time that it is being pulled through the foil feed and recovery station 140 along the conveying path T. This holding device 1 is installed directly in the workstation 140, horizontally under the plane along which the sheets pass.

According to the invention, the holding device 1 comprises two separate series of suction members 10, 20, each comprised of a plurality of suction members 11, 21 shown arranged parallel, extending along the conveying path of the sheets side by side and spaced apart perpendicular to the sheet conveying path T. Furthermore, the suction members 11, 21 of each series 10, 20 are transversely offset from the suction members 11, 21 of the other series 10, 20. Finally, the series of suction members 20 is mounted with the ability to move parallel to the sheet conveying path T. This mobility is between a retracted position, in which the suction members 11, 21 of each series 10, 20 are interposed between, that is alternate, with neighboring suction members 11, 21 of the other series 10, 20 (FIG. 2), and a deployed position, in which the suction members 11, 21 of each series 10, 20 are longitudinally offset from the suction members 11, 21 of the other series 10, 20 (FIG. 3).

Figure 2:
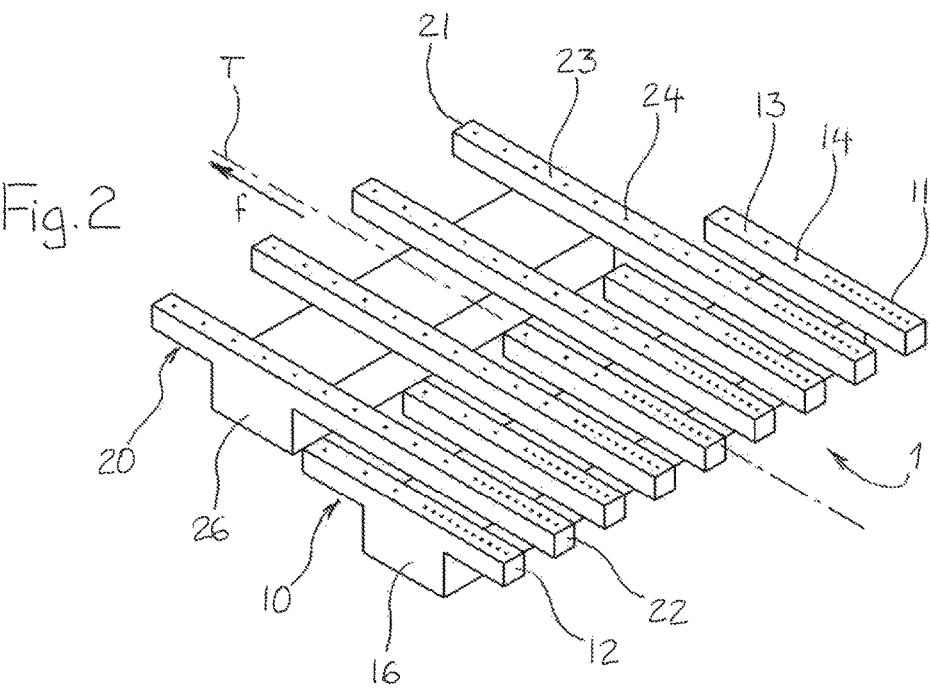
FIG. 2 is a perspective view from above depicting the holding device in a retracted position.
Figure 3:
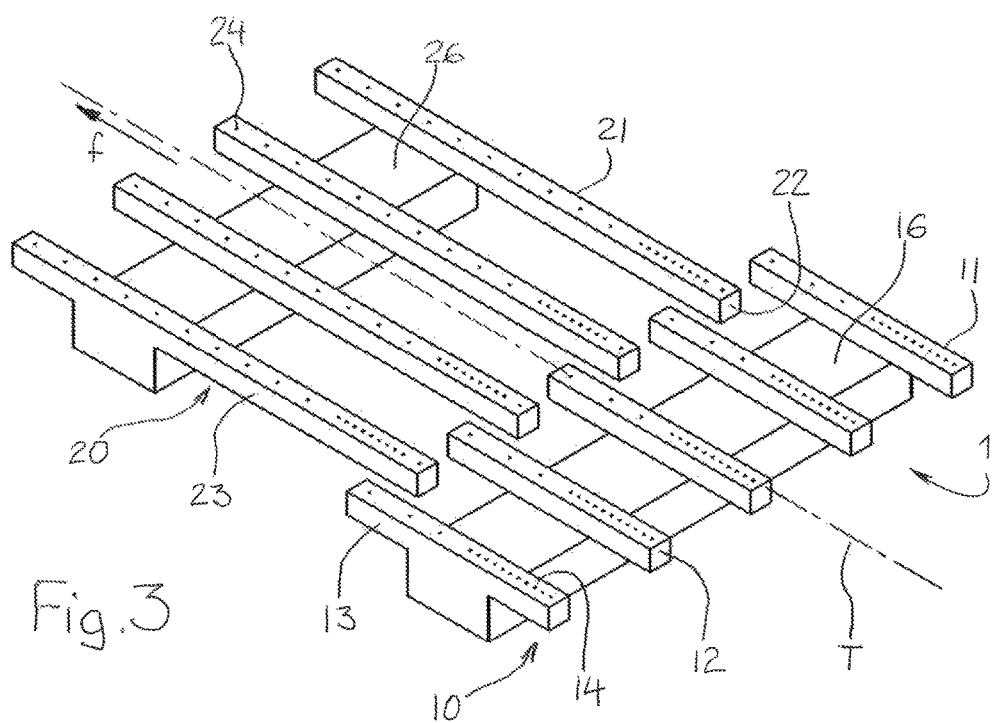
FIG. 3 is a figure similar to FIG. 2 but with the holding device in a deployed position.

In practice, the retracted position of FIG. 2 preferably corresponds to the position of use of the holding device 1 when the sheets processed by the machine 100 are at the maximum format, whereas the deployed position of FIG. 3 corresponds to the position of use of the holding device 1 when the sheets to be processed are at the minimum format.

FIG. 2 more specifically shows that in a retracted position the alternating suction members 11, 21 of the two series 10, 20 are next to another and therefore, extend side by side over a maximum portion of their lengths. In more general terms, if the two types of suction member 11, 21 have identical lengths, they will advantageously be placed entirely facing one another, but that if they have different lengths, the shorter ones will extend wholly facing the longer ones.

In a preferred design, in their retracted position, the upstream ends 12, 22 of the various suction members 11, 21 are substantially aligned on the same transverse line in FIG. 2. This allows all the suction members 11, 21 to be grouped together into that part of the conveying pathway that is most critical for holding, i.e. the most upstream part where each sheet begins to approach the holding device 1.

FIG. 3 shows that in the deployed position, the suction members 11, 21 of each series 10, 20 extend longitudinally substantially in the continuation of the suction members 11, 21 of the other series 10, 20. Important here is that there is no significant break between the series of members 10 and 20 in the holding function over the entire length of the sheet conveying pathway over the members. The implication here is that the two series of suction members 10, 20 should always be close to one another, ideally in direct continuation of one another, and never truly distant from one another. In other words, the two series of suction members 10, 20 need to extend more or less continuously from the upstream end to the downstream end of the sheet conveying pathway.

For preference, in this deployed position, it would seem to be advantageous for the suction members 11, 21 of the two series 10, 20 to remain transversely side by side over a minimum portion of their lengths. This is because this feature has the purpose of ensuring continuity of the holding function by requiring both types of suction members 11, 21 to be present together in the hinge zone between the two parts 10, 20 of the holding device 1. The respective fields of action of the two series of suction members 10, 20 then overlap longitudinally.

As may be seen from FIGS. 1 to 3, the two series of suction members 10, 20 are positioned substantially coplanar under the pathway followed by the sheets. This feature is of value whatever the relative position between the two series of suction members 11, 21 and is notably as valid for the retracted position as for the deployed position.

In a particularly advantageous way, the suction members 11, 21 of each series 10, 20 are positioned transversely so that they alternate with respect to the suction members 11, 21 of the other series 10, 20. Such an arrangement makes it possible to ensure that the action of the holding device 1 is uniform across its entire width.

According to another advantageous feature, the neighboring suction members 11, 21 of each series 10, 20 are positioned transversely spaced apart with respect to the suction members of the other series. The benefit of such spaces between neighboring suction members 11, 21 is that it allows rapid removal of air from beneath each sheet and leading movement of a sheet as the sheet approaches the holding device 1 or as it moves along the latter. The objective is to prevent an air cushion effect and to make it easier for the sheet to drop and then be held down firmly.

According to a currently preferred embodiment, each suction member 11, 21 comprises a hollow element 13, 23 which is, on the one hand, provided with suction orifices 14, 24 formed through a respective wall portion intended to contact each sheet as it travels, and, on the other hand, is connected to suction means 25 able to generate reduced pressure inside the hollow element 13, 23. However, any other type of suction member known from the prior art and otherwise adapted to the structure of the machine 100 could be used in an equivalent way.

As seen from FIGS. 2 and 3, each hollow element 13, 23 has an elongate shape which extends longitudinally, parallel to the direction of travel of the sheets.

FIGS. 2 and 3 show that, in an advantageous manner, the suction orifices 14, 24 are distributed over the entire length of each hollow element 13, 23. This feature contributes to preserving the continuity of the holding function by guaranteeing the regular presence of suction points from the start of the sheet conveying pathway to the end. As illustrated in FIGS. 2 and 3, the first series of suction members 10 may have a greater number of suction members than the second series 20 of suction members.

According to another advantageous feature, the suction orifices 14, 24 are distributed at a higher density, here being closer together, in the more upstream portion of each hollow element 13, 23 with reference to the conveyor path of the sheets. The shape and size of the orifices can contribute to this too. The object of such a distribution is to maximize suction at the start of the sheet conveying pathway in order to encourage each sheet to be held down firmly as it approaches the holding device 1.

In this exemplary embodiment, each suction member 11, 21 comprises a hollow bar of square cross section, which has a horizontal upper surface through which the suction orifices 14, 24 pass. Arranged longitudinally parallel to one another, the hollow bars that make up each series 10, 20 are supported by the same box chamber 16, 26, having an internal volume which communicates with the interior of the bars. The series of suction members 20 associated with the box chamber 26 constitutes the mobile part of the holding device 1, inasmuch as this set is mounted with the ability to effect a translational movement parallel to the sheet conveying path.

In FIG. 4, the suction means 25 here may comprise two suction pumps 25a, 25b which are respectively coupled to each series of suction members 10, 20 at the box chambers 16, 26. It is possible in an equivalent way to use any suction means other than suction pumps, whether these suction means be individual means as here, or means that are common to the two series of suction members 10, 20.

According to FIG. 5, the holding device 1 has guide means 30 which, as their name implies, are able to guide the movement of the mobile series 20 between its retracted position and its deployed position.

In this embodiment, the mobile part of the holding device 1 is in fact mounted with the ability to slide parallel to the sheet conveying path. This is why the guide means 30 combine two lateral rails 31, which are fixed longitudinally one on each side of the mobile part of the holding device 1, with two pairs of guide slides 32, 33 which are respectively arranged one on each side of the sheet conveying pathway. All of this is arranged in such a way that the two slides 32, 33 of each pair collaborate in sliding with, respectively, the upstream part and the downstream part of the corresponding lateral rail 31. The longitudinal sliding of the mobile part of the holding device 1 causes the mobile series 20 to move between the retracted position and the deployed position.

The holding device 1 comprises drive means 40 configured for moving the mobile series 20 between its retracted and deployed positions. What that means in other words is that the movement of the mobile part of the holding device 1 is advantageously motorized.

In this exemplary embodiment, the drive means 40 use a single mechanism which is installed on one of the sides of the holding device 1. As can be seen from FIG. 5, this drive mechanism uses a chain 41 which turns in a loop around two sprocket wheels of which one, 42, is mounted to idle whereas the other, 43, is a driving sprocket because it is rotationally coupled to a geared motor unit (not depicted). The drive mechanism is connected to the mobile part of the holding device 1 via a bracket 44 which provides a rigid connection between the chain 41 and the rail 31. The assembly is arranged such that the turning of the driving sprocket 43 causes, via the circulation of the chain 41, the mobile part of the holding device 1 to slide, and therefore causes the suction members 21 to effect a translational movement between the retracted position and the deployed position.

Of course, the invention relates more generally to any machine 100 for processing a succession of flat elements in sheet form which comprises at least one holding device 1 as described hereinabove.

The invention claimed is:

1. A machine for processing a succession of flat elements in sheet form, the machine comprising:
   a first workstation and a second workstation:
   a sheet conveyor configured to convey a sheet between a first position at the first workstation and a second position at the second workstation along a conveying path;
   a suction braking device configured to support and brake a sheet while being conveyed by the sheet conveyor between the first position and the second position, the suction braking device comprising:
   two suction members, each suction member comprising a plurality of suction elements extending along the conveying path, the suction elements being arranged side by side with each of the suction elements being spaced-apart from the neighboring suction elements in a direction perpendicular to the sheet conveying path and also thereby being transversely offset with respect to the suction elements of the other suction member;
   at least one of the two suction members is arranged to move parallel to the sheet conveying path with respect to the other suction member between a retracted position, in which each suction element of each member of the two suction members is interposed between the suction elements of the other member of the two suction members, and a deployed position, in which the suction elements of the one member of the two suction members are longitudinally offset with respect to the suction elements of the other member of the two suction members parallel to the conveying path,
   wherein the two suction members comprises a first series of suction elements and a second series of suction elements positioned in the deployed position downstream in a flat element conveying direction of the first series, and the first series comprises a greater number of suction elements than the second series.

2. A machine according to claim 1, wherein the two suction members together form a substantially planar sheet support surface.

3. A machine according to claim 1, wherein each suction element comprises a hollow element having a surface provided with suction orifices and the surface and the orifices being located and configured to support each sheet as each sheet is conveyed relative to the suction element.

4. A machine according to claim 3, wherein the respective suction orifices are distributed over substantially the entire length of each hollow element.

5. A machine according to claim 4, wherein the suction orifices are distributed at a higher density at an upstream portion of the conveying path than at a downstream portion of the conveying path of each hollow element.

6. A machine according to claim 1, wherein the sheet conveyor comprises one or more gripper bars configured to grab each sheet and convey it.

7. A machine according to claim 1, wherein the first position corresponds to a stamping station for the sheets.

8. A machine according to claim 1, wherein the second position corresponds to a delivery station for delivery thereto of all the sheets.

9. A machine according to claim 1, wherein the machine is configured to apply a hot foil stamping to a sheet.

10. A machine according to claim 1, wherein in the retracted position, the suction elements of the two series are interposed to extend side by side over a maximum portion of their lengths, and in the deployed position the two series do not extend side by side over a maximum portion of their length.

11. A machine according to claim 10, wherein in the retracted position, upstream ends of the various suction elements in the two series are aligned on a same transverse line across the conveying path.

12. A machine according to claim 1, wherein in the deployed position, the suction elements of the first series extend side by side with the suction elements of the second series.

13. A machine according to claim 12, wherein in the deployed position, the suction elements of the two series are in side by side position over a minimum portion of their lengths.

14. A machine according to claim 1, wherein the two series of suction elements are positioned substantially coplanar on the conveying path.

15. A machine according to claim 1, wherein the suction elements of each series alternate transversely of the conveying path with respect to the suction elements of the other series.

16. A machine according to claim 1, further comprising each suction element comprises a hollow element defined by a wall portion provided with suction orifices formed through the wall portion and the suction orifices are located and configured to come into contact with each sheet as each sheet travels over the wall portion, and
   suction pressure reducer configured to generate reduced pressure inside the hollow element to create suction at the suction orifices.

17. A machine according to claim 16, wherein each hollow element has an elongate shape which extends longitudinally, parallel to the conveying path of the sheets.

18. A machine according to claim 16, wherein the suction pressure reducer comprises a respective suction pump coupled to each respective series of suction elements.

19. A machine according to claim 1, further comprising a guide configured to guide movement of at least one series of suction elements between the retracted position and the deployed position.

20. A machine according to claim 1, further comprising drive means configured to move at least one series of suction elements between the retracted position and the deployed position.

* * * * *